(12) United States Patent
Desfriches et al.

(10) Patent No.: US 8,447,475 B2
(45) Date of Patent: May 21, 2013

(54) METHOD PROVIDING ASSISTANCE WITH HILL STARTS

(75) Inventors: Christophe Desfriches, Pacy-sur-eure (FR); Alessandro Monti, La Garenne Colombes (FR); Richard Pothin, Jouars-pontchartrain (FR)

(73) Assignee: Renault S.A.S., Boulogne-Billancourt (FR)

( * ) Notice: Subject to any disclaimer, the term of this patent is extended or adjusted under 35 U.S.C. 154(b) by 507 days.

(21) Appl. No.: 12/667,927

(22) PCT Filed: Apr. 22, 2008

(86) PCT No.: PCT/FR2008/050721
§ 371 (c)(1),
(2), (4) Date: Jan. 6, 2010

(87) PCT Pub. No.: WO2009/007553
PCT Pub. Date: Jan. 15, 2009

(65) Prior Publication Data
US 2010/0204890 A1    Aug. 12, 2010

(30) Foreign Application Priority Data
Jul. 6, 2007  (FR) ...................................... 07 56319

(51) Int. Cl.
*B62D 6/00*  (2006.01)
(52) U.S. Cl.
USPC ................ 701/48; 180/165; 477/92

(58) Field of Classification Search
USPC .................... 701/48, 36; 180/165; 477/92
See application file for complete search history.

(56) References Cited

U.S. PATENT DOCUMENTS

| | | | |
|---|---|---|---|
| 4,821,854 A * | 4/1989 | Koshizawa | 477/74 |
| 6,411,881 B1 * | 6/2002 | Thomas | 701/67 |
| 7,813,859 B2 * | 10/2010 | Aizawa et al. | 701/70 |
| 2005/0029865 A1 * | 2/2005 | Kobayashi | 303/191 |

FOREIGN PATENT DOCUMENTS

| | | |
|---|---|---|
| DE | 103 14 998 | 6/2004 |
| EP | 1 327 566 | 7/2003 |
| FR | 2 858 032 | 1/2005 |
| FR | 2858032 A1 * | 1/2005 |
| WO | 2004 067311 | 8/2004 |
| WO | WO 2004067311 A1 * | 8/2004 |

* cited by examiner

*Primary Examiner* — Thomas Black
*Assistant Examiner* — Shardul Patel
(74) *Attorney, Agent, or Firm* — Oblon, Spivak, McClelland, Maier & Neustadt, L.L.P.

(57) ABSTRACT

A method providing assistance with hill starts to a vehicle including a power plant connected to the driven wheels by a clutch and an automatic parking brake. The method generates an instruction to store in a memory a characteristic of a gradient which corresponds to a state in which it is estimated that the user and the vehicle are ready to pull away, on the basis of conditions that given physical parameters of the vehicle must satisfy.

15 Claims, 2 Drawing Sheets

METHOD PROVIDING ASSISTANCE WITH HILL STARTS

BACKGROUND

The present invention relates to a power-assistance method for uphill maneuvers for a vehicle.

More particularly it relates to a method for aiding in uphill starting of a motor vehicle having a manual or automatic gearbox.

On certain vehicles, the automobile manufacturers are offering a power-assisted parking brake.

By reason of its relatively high cost compared with the traditional parking brake solution, this power-assisted parking brake must provide performance that adds value for the customer.

To add value to this system, the manufacturers have therefore decided to associate therewith a power-assistance function for uphill maneuvers and especially power assistance for uphill starting (or pulling away), wherein the principle is to release the brakes on the non-driving wheels as soon as the torque transmitted by the engine to the driving wheels is sufficient to compensate for the inclination effect of the slope.

Such devices are already known.

In this regard, document GB 2376990 proposes a control module for a power-assisted parking brake device for a motor vehicle provided with a manual gearbox, which releases the force applied to the parking brake when it receives signals indicating to it, on the one hand, a positive displacement of the accelerator pedal and, on the other hand, that the position of the clutch pedal has reached its bite point. The instant at which the device releases the brake also depends on the clutch-pedal depression velocity, on the gear ratio engaged and on the slope on which the vehicle user is located.

This device has the disadvantage of being sensitive to pitching of the body during a stop, for example due to the movements of passengers, or to pitching of the vehicle when it pulls away.

In fact, before the brakes are released, the vehicle has a tendency to rise, the wheels remaining immobile as long as their movement is prevented by the brake, despite the torque being applied to them. One adverse consequence is delayed pull-away of the vehicle, since the calculated torque transmitted to the clutch is falsified by the data transmitted by the inclination sensor.

To avoid this phenomenon, a low-pass filter, for example, may be introduced to filter the noise and the high-frequency components of the sensor. However, this is not sufficient if the estimate of the transmitted torque is not precise.

BRIEF SUMMARY

One objective of the invention is to alleviate these disadvantages of the prior art by proposing a power-assistance method for uphill maneuvers which is insensitive to pitching of the vehicle body.

Another objective of the invention is to propose a power-assistance method for uphill maneuvers applicable to vehicles equipped with a manual or automatic gearbox.

For that purpose, the invention proposes a power-assistance method for uphill maneuvers for a vehicle provided with a motive power assembly connected to the driving wheels by means of a clutch and with an automatic parking brake, characterized in that it comprises a step consisting in generating an instruction to enter into memory the slope characteristic which corresponds to a state in which it is estimated that the user and the vehicle are ready to pull away, on the basis of conditions that determined physical parameters of the vehicle must satisfy.

Certain preferred but non-limitative aspects of the method according to the invention are the following:

the determined parameters are:
  the vehicle speed,
  the stop time of the vehicle,
  the engagement of a gear ratio,
  the accelerator-pedal position, and
  the angular velocity of rotation of the assembly,
the conditions that the determined parameters of the vehicle must satisfy are that, simultaneously:
  the vehicle speed must be lower than a defined minimum speed, beginning from a time longer than a defined stop time,
  a gear ratio must be engaged,
  the accelerator pedal must be depressed to a position ($\theta_{acc}$) lower than a defined threshold position, and
  the angular velocity of rotation of the motive power assembly must be greater than a minimum angular velocity of rotation,
the conditions are satisfied when, in addition, the clutch pedal is depressed to a position higher than a certain threshold position,
brake release takes place only if the step of instructing the slope characteristic to be entered into memory is generated,
brake release takes place only when the torque transmitted to the clutch attains a threshold transmitted torque referred to as pull-away torque,
the transmitted pull-away torque is estimated or calculated as a function of the recorded slope characteristic,
the threshold pull-away torque is equal to:
  0 if the recorded slope characteristic is positive or zero and reverse is engaged, or if the recorded slope is negative or zero and forward is engaged,
  $m \cdot g \cdot \sin(\theta_{slope}) \cdot r(b) \cdot \rho_{wheels}$ if the recorded slope characteristic is strictly positive and forward is engaged, or if the recorded slope is strictly negative and reverse is engaged,
where
  m is the mass of the vehicle,
  g is gravity,
  $\theta_{slope}$ is the slope characteristic,
  r(b) is the engaged gear ratio, corresponding to the position b of the gearshift lever,
  $\rho_{wheels}$ the radius under load of the vehicle wheels
the threshold position of the accelerator pedal is determined by virtue of a mapping of the accelerator pedal.

According to a second aspect of the invention, there is proposed a device for power assistance of uphill maneuvers for a motor vehicle provided with a motive power assembly connected to the driving wheels by means of a clutch, the device comprising an automatic parking brake, means for commanding brake release, an inclination sensor, means for determining the vehicle speed, means for detecting and determining a gear engaged by the gearbox, means for determining the accelerator-pedal position, as the case may be, means for determining the clutch-pedal position, and a computer, characterized in that the said means make it possible to employ a power-assistance method according to the invention for uphill maneuvers.

The invention also proposes a vehicle employing a power-assistance device according to the invention for uphill maneuvers.

BRIEF DESCRIPTION OF THE DRAWINGS

Other characteristics, objectives and advantages of the present invention will become apparent upon reading the detailed description hereinafter with reference to the attached drawings, provided by way of non-limitative examples and wherein:

FIG. 1 presents the functional architecture of a vehicle equipped with the device according to the invention.

DETAILED DESCRIPTION

Figure 1:
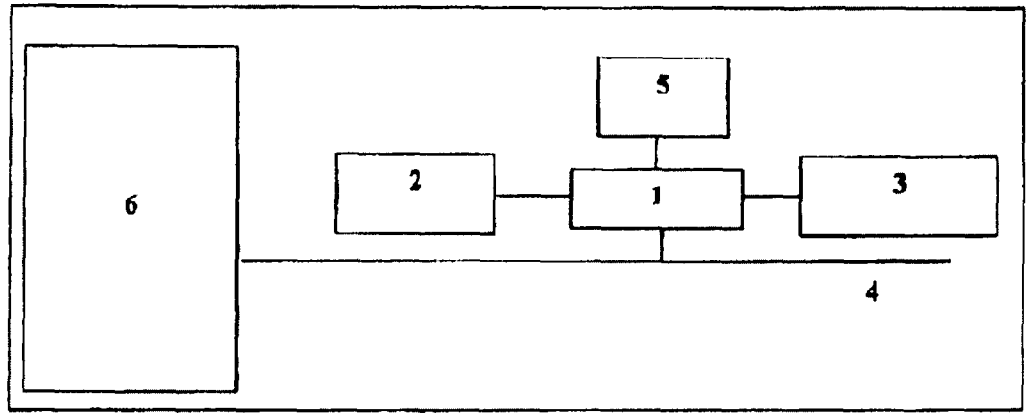

A vehicle equipped with a power-assistance device for uphill starting according to the invention comprises a motive power assembly, a power-assisted parking brake 5, a bus 4 on which the signals originating from the rest of the vehicle 6 travel, and a computer for control of the motive power assembly.

Bus 4 is preferably a bus based on the CAN™ Standard (Control Area Network, or in other words a control zone network).

The motive power assembly is composed of a heat engine coupled to the driving wheels by a transmission device provided with a gearbox and a clutch, which can be controlled by the user (in the case of vehicles with manual gearboxes) or by an automatic system (in the case of a vehicle equipped with an automatic gearbox).

Alternatively, the motive power assembly may be provided with one or more electrical machines, with or without heat engine.

The power-assistance device for uphill starting cooperates with a computer 1 for control of power-assisted parking brake 5, which is also connected to bus 4.

Computer 1 is equipped in known manner with a means for producing orders to apply and release power-assisted parking brake 5, the said orders 5 being generated on a line for connection to power-assisted parking brake 5 itself. If necessary, computer 1 is also equipped with a means for transmitting to bus 4 items of information on the state of power-assisted parking brake 5.

Computer 1 for control of power-assisted parking brake 5 is connected by an appropriate line to an inclination sensor 2. In other embodiments, if an item of information about the inclination of the slope is available on bus 4, sensor 2 is replaced by an equivalent means, which samples this item of information in the data stream traveling over bus 4.

When the vehicle is stopped on a slope, inclination sensor 2 delivers a signal representative of the inclination of the slope (which will also be referred to by the expression slope characteristic) on which the vehicle is stopped.

When computer 1 for control of power-assisted parking brake 5 produces an order to apply power-assisted parking brake 5, the movable parts of the brakes cause the disks to be clamped in such a way that power-assisted parking brake 5 is applied.

Inversely, when computer 1 for control of power-assisted parking brake 5 produces an order to release power-assisted parking brake 5, the movable parts of the brakes are released.

Furthermore, in the brake-release situation (regardless of the inclination of the slope), the motive power assembly of the vehicle produces a torque, which is or is not transmitted to the wheels, depending on whether or not the clutch is active, and in a proportion that depends on the clutch position.

Thus, as will be seen hereinafter, the principle of the invention consists in determining a condition for release of power-assisted parking brake 5, as a function in particular of the slope characteristic, measured when the user and the vehicle are ready to pull away, and of the torque $C_T$ transmitted to the clutch. This condition is determined in such a way that the vehicle is capable of pulling away as soon as a certain threshold, at which the slope effect is balanced by the engine torque, is exceeded.

In order to pull away, a vehicle parked on a slope must overcome the slope effect due to gravitational force.

This effect is a function of the slope characteristic and of the mass of the vehicle, and is equal to $$m \cdot g \cdot \sin(\theta_{slope})$$

where
m is the mass of the vehicle,
g is gravity,
$\theta_{slope}$ is the slope characteristic.

The minimum torque $C_{T\_threshold}$ that must be transmitted to the clutch via the kinematic chain of the wheel in order to permit the vehicle to pull away (or in other words to start on the slope) must be at least equal to $$C_{T\_threshold} = m \cdot g \cdot \sin(\theta_{slope}) \cdot r(b) \cdot \rho_{wheels}$$

where
r(b) is the engaged gearbox ratio corresponding to position b of the gearshift lever,
$\rho_{wheels}$ is the radius under load of the vehicle wheels.

This torque $C_{T\_threshold}$ is the threshold pull-away torque.

The strategy proposed by the invention is based on the use of this relationship.

In particular, it consists in releasing automatic parking brake 5 in the phase of starting from a stop, when the torque $C_T$ transmitted to the clutch is greater than the threshold pull-away torque $C_{T\_threshold}$.

Figure 2:
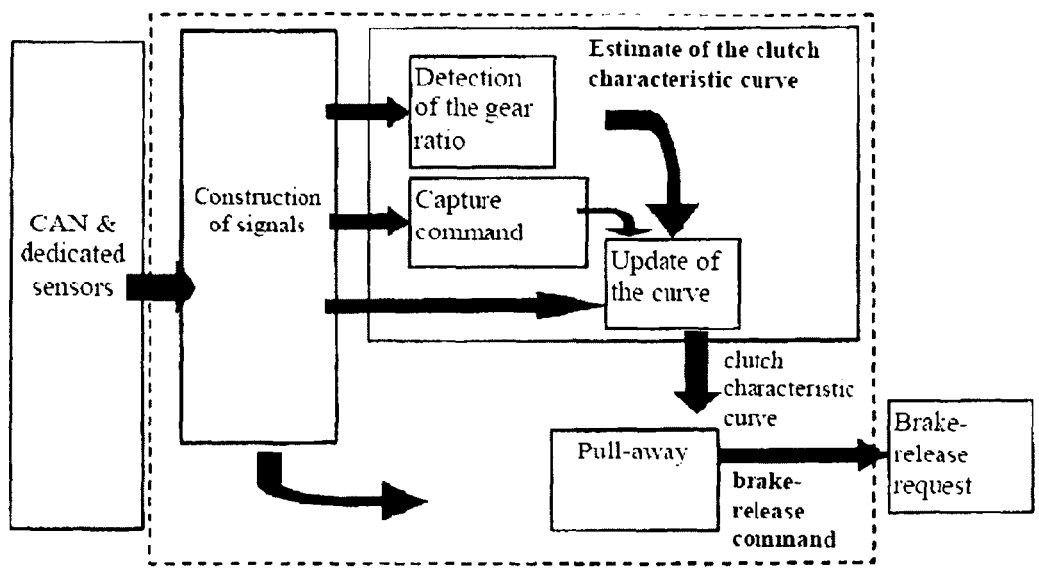
FIG. 2 illustrates the functioning principle of the automatic system that estimates the torque transmitted to the wheels of a vehicle having a manual gearbox, employed in the invention.

For manual gearboxes, the transmitted torque $C_T$ is estimated by an automatic system such as that described by French Patent Application FR 2828450 (illustrated by the attached FIG. 2, for a manual gearbox, and which we will not describe further in the description hereinafter), while for automatic and/or robotized gearboxes it is calculated then transmitted by a torque converter, according to known techniques.

We will now describe the operating principle of the pull-away algorithm of the method of the invention.

The algorithm uses the estimate or the calculation of the transmitted torque $C_T$ and interprets the intent of the driver.

During pull-away, the vehicle has a tendency to rise, which adds to the information furnished by the sensor about the slope characteristic and consequently increases the estimate of the threshold pull-away torque $C_{T\_threshold}$.

The moment at which the vehicle and its user are ready to pull away is therefore detected, and the slope characteristic corresponding to this instant is "frozen".

To freeze the characteristic, storage means enter into memory the value of the characteristic $\theta_{slope}$ of the slope corresponding to this instant.

Figure 3:
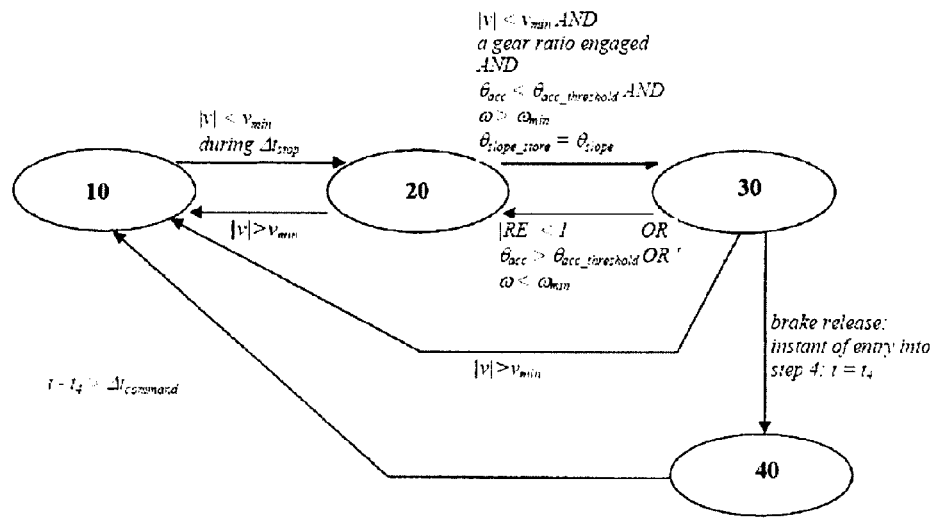
FIG. 3 presents the automatic system used to detect the situation in which the vehicle and the user are ready to pull away.
Figure 4:
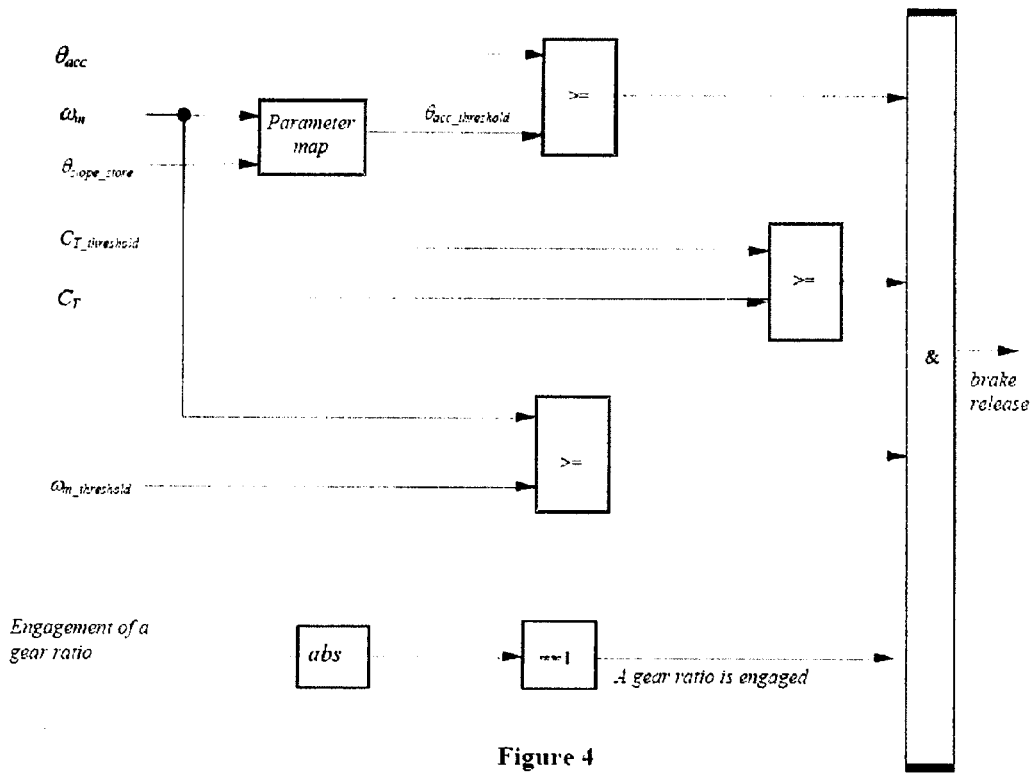
FIG. 4 presents a schematic diagram of the method according to the invention for aiding in uphill starting.

Detection of the said instant is achieved with the aid of the automatic system illustrated in FIG. 3, which may assume four distinct and successive states.

In a first state 10, the vehicle speed v is higher than a defined minimum speed $v_{min}$. The automatic system then considers that the vehicle is in motion.

In a second state 20, the vehicle speed v is lower than the minimum speed $v_{min}$ for a defined time $\Delta t_{stop}$. The automatic system then considers the vehicle to be at a stop (or at least that the vehicle is on the point of executing an uphill maneuver).

If, in this second state, the speed v becomes higher than the minimum speed $v_{min}$ in the course of the defined time $\Delta t_{stop}$, then the automatic system returns to initial state 10.

When the physical parameters of speed v, time t, accelerator-pedal position $\theta_{acc}$ (which position can be given, for example, as a percentage depression of the pedal), and angular velocity ω of rotation of the motive power assembly satisfy the determined conditions, the automatic system estimates that the user and the vehicle are ready to pull away. It then generates an instruction to enter into memory the slope characteristic $\theta_{slope}$ that corresponds to the state in which the parameters satisfy the said conditions, and it proceeds to a third state 30. The transition from state 20 to state 30 can take place only if this entry into memory is effected.

For generation of the instruction to enter the information into memory, a simple "Sample and Hold" mechanism (or in other words a sampler-clamper mechanism) is sufficient. From now on we will denote this recorded characteristic by the symbol $\theta_{slope\_store}$.

The conditions that the said parameters must satisfy are that the vehicle speed v is lower than the minimum speed $v_{min}$ beginning from a time t longer than the time $\Delta t_{stop}$, that a gear ratio is engaged, that the vehicle user depresses the accelerator pedal to a position $\theta_{acc}$ lower than a defined threshold position $\theta_{acc\_threshold}$ and that the angular velocity of rotation ω of the motive power assembly is higher than a minimum angular velocity of rotation $\omega_{min}$.

Advantageously, $\theta_{acc\_threshold}$ depends on the value of the recorded slope characteristic $\theta_{slope\_store}$ and on the angular velocity of rotation ω. This value may be, for example, the lowest value furnished by the accelerator mapping.

In the case of manual gearboxes, a supplementary condition for estimating that the vehicle and the user are ready to pull away is to verify that the clutch pedal is depressed as far as a position $\theta_{clutch}$ (which position can be given, for example, in percentage depression of the pedal) higher than a defined position $\theta_{clutch\_threshold}$.

If one of the conditions of vehicle speed v, time t, engagement of a gear ratio, accelerator-pedal position $\theta_{acc}$, angular velocity of rotation ω of the motive power assembly and, as the case may be, clutch-pedal position $\theta_{clutch}$ is not satisfied, the automatic system remains in state 20.

If one of the conditions of time t, engagement of a gear ratio, accelerator-pedal position $\theta_{acc}$, angular velocity of rotation ω of the motive power assembly and, as the case may be, clutch-pedal position $\theta_{clutch}$ is not satisfied, the automatic system returns to state 20.

If the vehicle speed v becomes higher than the minimum speed $v_{min}$, the automatic system returns to state 10. Such a case occurs when, for example, the vehicle was stopped at a traffic signal on level pavement. The user then has no need for power-assisted starting.

The minimum torque $C_{T\_threshold}$ calculated for pulling away is then evaluated as a function of this recorded item of information $\theta_{slope\_store}$ and no longer as a function of the characteristic delivered by the inclination sensor.

The threshold pull-away torque $C_{T\_threshold}$, then assumes the value:

0 if the recorded slope characteristic ($\theta_{slope\_store}$) is positive or zero and reverse is engaged, or if the recorded slope ($\theta_{slope\_store}$) is negative or zero and forward is engaged, $m \cdot g \cdot \sin(\theta_{slope}) \cdot r(b) \cdot \rho_{wheels}$ if the recorded slope characteristic ($\theta_{slope\_store}$) is strictly positive and forward is engaged, or if the recorded slope ($\theta_{slope\_store}$) is strictly negative and reverse is engaged, $$C_{T\_threshold} = \begin{cases} 0 & \text{if } [(\theta_{slope\_store} \geq 0) \wedge (RE = -1)] \vee \\ & [(\theta_{slope\_store} \leq 0) \wedge (RE = 1)] \\ r(b) \cdot \rho_{wheels} \cdot m \cdot g \cdot & \text{if } [(\theta_{slope\_store} > 0) \wedge (RE = 1)] \vee \\ \sin(\theta_{slope\_store}) & [(\theta_{slope\_store} < 0) \wedge (RE = -1)] \end{cases}$$

This definition of the threshold pull-away torque $C_{T\_threshold}$ therefore makes it possible to fix the said threshold torque $C_{T\_threshold}$ at zero in the cases in which the user starts off in the downhill direction of the slope.

If the torque $C_T$ transmitted to the clutch (estimated according to the method of Application FR 2828450 or calculated by the torque converter of the gearbox) is greater than or equal to the pull-away torque $C_{T\_threshold}$ calculated as a function of the information about the recorded slope characteristic $\theta_{slope\_store}$, and if the conditions of speed, time t, engagement of a gear ratio, accelerator-pedal position $\theta_{acc}$, angular velocity of rotation ω of the motive power assembly and, as the case may be, clutch-pedal position $\theta_{clutch}$ are still satisfied, the automatic system then enters a fourth state 40.

In this fourth state, the pull-away conditions are satisfied beginning from a time t shorter than a second determined time $\Delta t_{command}$ (t<$\Delta t_{command}$).

By pull-away conditions, there are understood here the conditions for which the automatic system considers that the vehicle and the user are ready to pull away, and the condition imposed on the transmitted torque: $C_T \geq C_{T\_threshold}$.

When the automatic system enters state 40, control computer 1 commands automatic parking brake 5 to release. At this point t=$t_4$, where $t_4$ corresponds to the time at which the automatic system entered state 40.

At the end of the second determined time (or in other words when 1−$t_4$>$\Delta t_{command}$), the automatic system returns to state 1 and resets the time t to zero.

At the theoretical instant of pulling away, or in other words at the instant at which the user and the vehicle are ready to pull away, and at which the torque $C_T$ transmitted to the clutch is greater than or equal to the pull-away torque $C_{T\_threshold}$, the torque furnished by the engine must be at least greater than the torque $C_T$ transmitted by the clutch.

In fact, in the opposite case, the vehicle has a high risk of stalling.

To avoid any stalling of the vehicle, it is necessary:
that the user accelerate, or
that the engine speed be sufficient to generate the torque demanded by the user.

Obviously the first condition is not desirable.

To avoid any intervention by the user under these circumstances, a mapping of the accelerator pedal is therefore constructed.

For all mapped slopes and engine speeds, measurements are made of the minimal accelerator-pedal position $\theta_{acc\_threshold}$ necessary for the engine speed to be sufficient to generate the torque demanded by the user in order to pull away without stalling.

This mapping can be determined beforehand by track tests.

The invention claimed is:
1. A power-assistance method for uphill maneuvers for a vehicle including a motive power assembly connected to driving wheels by a clutch and with an automatic parking brake, the method comprising:
- determining whether determined parameters satisfy conditions indicating that the vehicle is in a state in which the vehicle is ready to pull away;
- when the determined parameters are determined to satisfy the conditions, generating an instruction to enter into a memory a slope characteristic which corresponds to the state in which the vehicle is ready to pull away;
- after the slope characteristic is entered into the memory, calculating a minimum torque for the vehicle to pull away based on the slope characteristic entered into the memory; and
- releasing the automatic parking brake when a torque transmitted to the clutch is greater then the minimum torque calculated for the vehicle to pull away.

2. A power-assistance method according to claim 1, wherein the determined parameters include:
- vehicle speed,
- stop time of the vehicle,
- engagement of a gear ratio,
- accelerator-pedal position, and
- angular velocity of rotation of the motive power assembly.

3. A power-assistance method according to claim 1, wherein the conditions that the determined parameters of the vehicle must satisfy are that, simultaneously:
- vehicle speed must be lower than a defined minimum speed, beginning from a time longer than a defined stop time,
- a gear ratio must be engaged,
- an accelerator pedal must be depressed to a position lower than a defined threshold position, and
- angular velocity of rotation of the motive power assembly must be greater than a minimum angular velocity of rotation.

4. A power-assistance method according to claim 3, wherein the conditions are satisfied when, in addition, the clutch pedal is depressed to a position higher than a certain threshold position.

5. A power-assistance method according to claim 3, wherein the releasing the automatic brake takes place only if the instruction to enter the slope characteristic into the memory is generated.

6. A power-assistance method according to claim 1, wherein the minimum torque calculated for the vehicle to pull away is equal to:
- 0 if the slope characteristic entered into the memory is positive or zero and reverse is engaged, or if the slope characteristic entered into the memory is negative or zero and forward is engaged,
- $m \cdot g \cdot \sin(\theta_{slope}) \cdot r(b) \cdot \rho_{wheels}$ if the slope characteristic entered into the memory is strictly positive and forward is engaged, or if the slope characteristic entered into the memory is strictly negative and reverse is engaged, in which
  - m is mass of the vehicle,
  - g is gravity,
  - $\theta_{slope}$ is the slope characteristic entered into the memory,
  - r(b) is an engaged gear ratio, corresponding to a position b of a gearshift lever, and
  - $\rho_{wheels}$ is a radius under load of the vehicle wheels.

7. A power-assistance method according to claim 3, wherein the threshold position of the accelerator pedal is determined by virtue of a mapping of the accelerator pedal.

8. A device for power assistance of uphill maneuvers for a motor vehicle comprising a motive power assembly connected to the driving wheels by a clutch, the device comprising:
- an automatic parking brake;
- an inclination sensor to determine a slope characteristic of a hill on which the vehicle is positioned;
- means for determining the vehicle speed;
- means for detecting and determining a gear engaged by the gearbox;
- means for determining the accelerator-pedal position; and
- a computer to control an application and a release of the automatic parking brake, wherein the computer is configured to:
  - determine whether determined parameters satisfy conditions indicating that the vehicle is in a state in which the vehicle is ready to pull away,
  - when the determined parameters are determined to satisfy the conditions, generate an instruction to enter into a memory the slope characteristic measured by the inclination sensor which corresponds to the state in which the vehicle is ready to pull away,
  - after the slope characteristic is entered into the memory, calculate a minimum torque for the vehicle to pull away based on the slope characteristic entered into the memory, and
  - release the automatic parking brake when a torque transmitted to the clutch is greater then the minimum torque calculated for the vehicle to pull away.

9. A vehicle employing a device for power assistance of uphill maneuvers according to claim 8.

10. A device according to claim 8, wherein the determined parameters include:
- vehicle speed,
- stop time of the vehicle,
- engagement of a gear ratio,
- accelerator-pedal position, and
- angular velocity of rotation of the motive power assembly.

11. A device according to claim 8, wherein the conditions that the determined parameters of the vehicle must satisfy are that, simultaneously:
- vehicle speed must be lower than a defined minimum speed, beginning from a time longer than a defined stop time,
- a gear ratio must be engaged,
- an accelerator pedal must be depressed to a position lower than a defined threshold position, and
- angular velocity of rotation of the motive power assembly must be greater than a minimum angular velocity of rotation.

12. A device according to claim 11, wherein the conditions are satisfied when, in addition, the clutch pedal is depressed to a position higher than a certain threshold position.

13. A device according to claim 11, wherein the automatic brake is released only if the instruction to enter the slope characteristic into the memory is generated.

14. A device according to claim 11, wherein the threshold position of the accelerator pedal is determined by virtue of a mapping of the accelerator pedal.

15. A device according to claim 8, wherein the minimum torque calculated for the vehicle to pull away is equal to:
- 0 if the slope characteristic entered into the memory is positive or zero and reverse is engaged, or if the slope characteristic entered into the memory is negative or zero and forward is engaged,
- $m \cdot g \cdot \sin(\theta_{slope}) \cdot r(b) \cdot \rho_{wheels}$ if the slope characteristic entered into the memory is strictly positive and forward is engaged, or if the slope characteristic entered into the memory is strictly negative and reverse is engaged, in which m is mass of the vehicle,
g is gravity,
$\theta_{slope}$ is the slope characteristic entered into the memory,
r(b) is an engaged gear ratio, corresponding to a position b of a gearshift lever, and
$\rho_{wheels}$ is a radius under load of the vehicle wheels.

* * * * *

UNITED STATES PATENT AND TRADEMARK OFFICE
CERTIFICATE OF CORRECTION

PATENT NO. : 8,447,475 B2
APPLICATION NO. : 12/667927
DATED : May 21, 2013
INVENTOR(S) : Christophe Desfriches et al.

Page 1 of 1

It is certified that error appears in the above-identified patent and that said Letters Patent is hereby corrected as shown below:

On the title page, Item (86), the PCT information is incorrect. Item (86) should read:

--(86) PCT No.: PCT/FR2008/050721

§371 (c)(1),
(2), (4) Date: Mar. 16, 2010--

Signed and Sealed this
Sixth Day of August, 2013

Teresa Stanek Rea
*Acting Director of the United States Patent and Trademark Office*